(12) United States Patent
Fogelberg

(10) Patent No.: US 11,465,087 B2
(45) Date of Patent: Oct. 11, 2022

(54) VALVE, USE OF SUCH VALVE, SEPARATOR COMPRISING SUCH VALVE AND METHOD OF OPERATING A SEPARATOR

(71) Applicant: Husqvarna AB, Huskvarna (SE)

(72) Inventor: Andreas Fogelberg, Söderköping (SE)

(73) Assignee: HUSQVARNA AB, Huskvarna (SE)

( * ) Notice: Subject to any disclaimer, the term of this patent is extended or adjusted under 35 U.S.C. 154(b) by 89 days.

(21) Appl. No.: 16/610,272

(22) PCT Filed: May 2, 2018

(86) PCT No.: PCT/EP2018/061126
§ 371 (c)(1),
(2) Date: Nov. 1, 2019

(87) PCT Pub. No.: WO2018/202670
PCT Pub. Date: Nov. 8, 2018

(65) Prior Publication Data
US 2020/0147538 A1    May 14, 2020

(30) Foreign Application Priority Data

May 2, 2017   (SE) .................... 1750525-6

(51) Int. Cl.
*B01D 46/42*       (2006.01)
*B01D 45/16*       (2006.01)
(Continued)

(52) U.S. Cl.
CPC ............ *B01D 46/4272* (2013.01); *A47L 9/20* (2013.01); *B01D 45/16* (2013.01);
(Continued)

(58) Field of Classification Search
CPC ............ B01D 45/16; B01D 46/4272; B01D 46/0068; B01D 46/2414; B01D 2275/201;
(Continued)

(56) References Cited

U.S. PATENT DOCUMENTS 2,595,603 A   5/1952 Parsons
3,384,122 A   5/1968 Harpman
(Continued)

FOREIGN PATENT DOCUMENTS

CH    365919 A    11/1962
CN    1230100 A    9/1999
(Continued)

OTHER PUBLICATIONS

Swedish Search Report for Application No. 1750525-6 dated Nov. 30, 2017.
(Continued)

*Primary Examiner* — William M McCalister
(74) *Attorney, Agent, or Firm* — Burr & Forman LLP

(57) ABSTRACT

This document discloses a valve comprising a main valve closure body, arranged on a low pressure side of the valve and moveable to open towards the low pressure side, a control body, fixedly connected to the main valve closure body, such that a position of the main valve closure body is fixed relative to a position of the control body, a control chamber, partially defined by the control body, whereby a volume of the control chamber is variable in relation to the position of the control body, and a control fluid connector for controlling a pressure in the control chamber. The document also discloses use of the valve in a separator for separating dust and debris from an airflow, a separator comprising such a valve and a method of operating a separator.

17 Claims, 4 Drawing Sheets

(51) Int. Cl.
*B01D 46/24* (2006.01)
*F16K 31/126* (2006.01)
*F16K 31/128* (2006.01)
*F16K 39/02* (2006.01)
*B01D 46/71* (2022.01)
*F16K 31/06* (2006.01)
*A47L 9/20* (2006.01)

(52) U.S. Cl.
CPC ......... *B01D 46/2414* (2013.01); *B01D 46/71* (2022.01); *F16K 31/128* (2013.01); *F16K 31/1266* (2013.01); *F16K 39/022* (2013.01); *B01D 2275/201* (2013.01); *F16K 31/0624* (2013.01)

(58) Field of Classification Search
CPC ..... A47L 9/20; F16K 31/1266; F16K 31/128; F16K 39/022
USPC .......................................................... 251/26
See application file for complete search history.

(56) References Cited

U.S. PATENT DOCUMENTS

| | | | |
|---|---|---|---|
| 3,608,587 A | 9/1971 | Zbell | |
| 4,036,614 A * | 7/1977 | DeMarco | A47L 9/0072 55/310 |
| RE29,481 E * | 11/1977 | Larner | F15B 13/042 137/596.15 |
| 4,067,357 A * | 1/1978 | Ruchser | F15B 13/0405 137/596.15 |
| 5,951,746 A | 9/1999 | Treitz et al. | |
| 6,827,100 B1 | 12/2004 | Carlson | |
| 2001/0029845 A1 | 10/2001 | Dyson et al. | |
| 2011/0258975 A1 * | 10/2011 | Lundgren | B01D 46/2414 55/357 |
| 2012/0137467 A1 | 6/2012 | Treitz | |
| 2013/0105014 A1 * | 5/2013 | Brooks | F16K 31/1245 137/625.6 |
| 2015/0176545 A1 * | 6/2015 | Troxell | B01D 46/0005 55/302 |
| 2017/0151524 A1 * | 6/2017 | King | A47L 9/0072 |
| 2017/0290479 A1 * | 10/2017 | Conrad | A47L 9/1608 |
| 2017/0340179 A1 | 11/2017 | Peflof et al. | |

FOREIGN PATENT DOCUMENTS

| | | | |
|---|---|---|---|
| CN | 101745284 A | 6/2010 | |
| CN | 102917628 A | 2/2013 | |
| DE | 1028841 B | 4/1958 | |
| DE | 1650326 A1 | 8/1970 | |
| DE | 102010029524 A1 | 12/2011 | |
| DE | 102015113189 A1 | 2/2017 | |
| EP | 1656872 A2 | 5/2006 | |
| EP | 2236876 A2 | 10/2010 | |
| EP | 2575587 B1 | 7/2017 | |
| GB | 1174143 A | 12/1969 | |
| WO | WO-9316309 A1 * | 8/1993 | ............... A01J 5/14 |
| WO | 2009041890 A2 | 4/2009 | |
| WO | 2016112996 A1 | 7/2016 | |

OTHER PUBLICATIONS

International Search Report and Written Opinion for International Application No. PCT/EP2018/061126 dated Aug. 2, 2018.

* cited by examiner

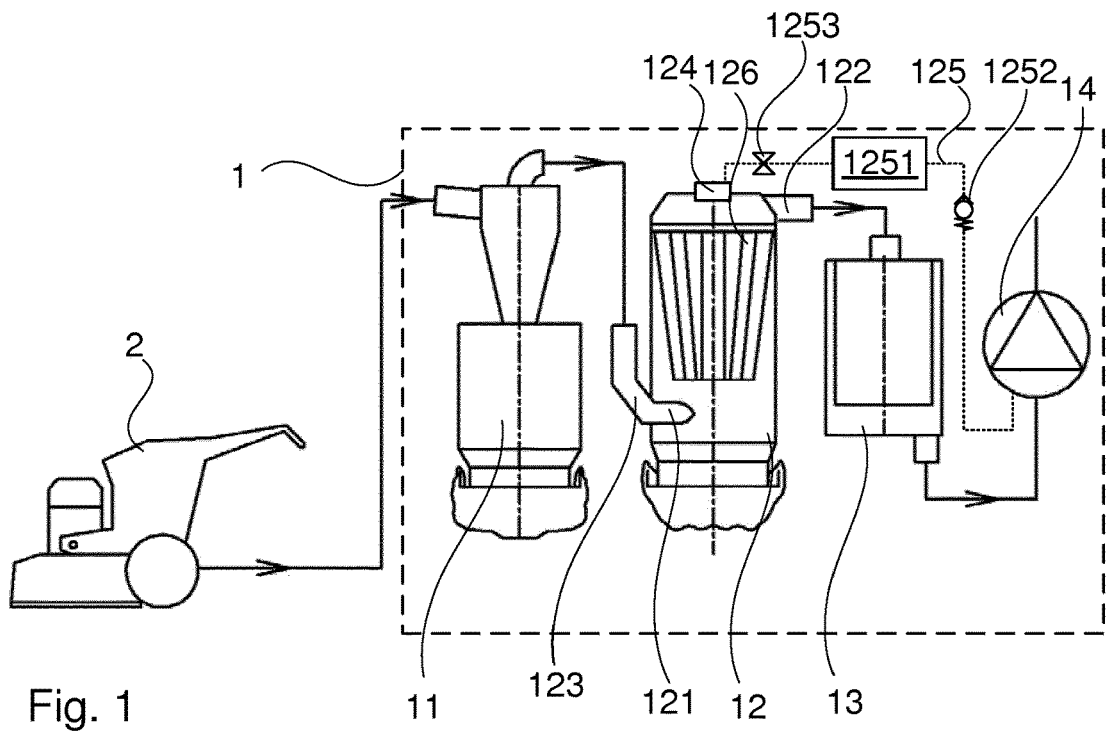
Fig. 1
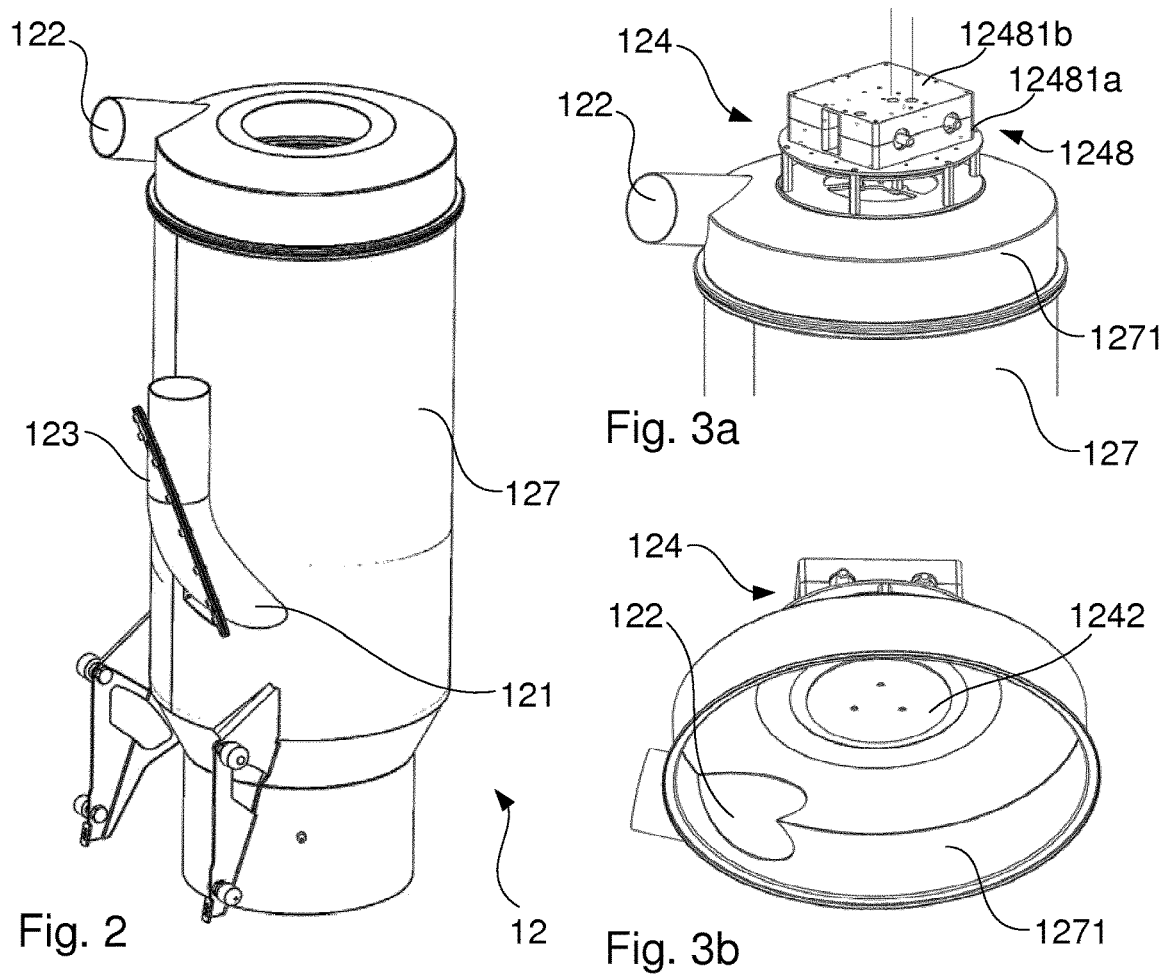
Fig. 2
Fig. 3a
Fig. 3b

VALVE, USE OF SUCH VALVE, SEPARATOR COMPRISING SUCH VALVE AND METHOD OF OPERATING A SEPARATOR

TECHNICAL FIELD

The present disclosure relates to a valve, to the use of such valve as a cleaning valve for a separator, to a separator comprising such valve and to a method of operating a separator.

More particularly, the disclosure relates to a cleaning valve for a separator, i.e. to a valve that is used to create a reverse burst of air through a filter of a separator, in order to clean the filter.

BACKGROUND

Separators are used for separating particles (including powder, granules, debris, etc.) from a flow of fluid, such as air, oil or water.

Some separators make use of a permeable separator body which traps the particles as the flow is directed through the separator body. The separator body may take the form of a grille, a net or a filter medium. A filter medium may comprise a porous material that ideally is permeable to the fluid but not to the particle that is to be separated. In many applications, the filter material may be a woven or non-woven material fiber material.

As particles become trapped in the separator body, the separator body will gradually become clogged, leading to an increase in pressure drop over the filter, which affects the efficiency of the entire system.

Hence, it may be necessary to maintain the separator body, e.g. by exchanging it or by cleaning it.

In many applications, cleaning the separator body is the method of choice, since the separator body as such has a life which is substantially greater than the time it takes for it to clog.

There are various methods of cleaning the separator body, some of which include removing it from its place of operation, and others including cleaning the separator body in situ. The latter may involve various methods of scraping, striking or agitating the separator body.

A particular way of cleaning a separator body is by subjecting it to a reverse burst of the fluid. That is, fluid is caused to rapidly flow backwards through the separator body, whereby particles that are trapped on the separator body side which is upstream in normal operation are released from the separator body, and preferably collected and removed.

Directions "upstream" and "downstream" are defined relative to the normal flow of fluid and material in the separator, during a normal separating operation.

In heavy duty separators for separating particles from air (essentially heavy duty "vacuum cleaners"), e.g. in connection with grinding of stone or concrete, a suction generator is normally arranged downstream of the separator, such that the suction generator draws air through the separator and thus through the separator body.

Referring to FIG. 1, such heavy duty separators may comprise a pre-separator, which may have the form of a settling chamber, coarse filter, a cyclone separator or a centrifugal separator, and a post-separator, such as a HEPA filter for separating out the finest particles not caught by the main separator. The suction generator would then typically be situated downstream of the main separator, and in many cases also downstream of the post-separator.

In order to clean the separator body, the separator inlet is typically closed, while the suction generator is allowed to operate, such that an underpressure (i.e. pressure lower than ambient pressure) is built up inside the separator. Once the underpressure has been established, a valve at the downstream side of the separator body, a "cleaning valve" is quickly opened, connecting the downstream side of the separator body to higher pressure air, such as ambient air, whereby air will rush backwards through the separator body, cause agitation of the separator body and release particles caught on the upstream side of the separator body. If the separator body is appropriately oriented, then the particles will drop to the bottom of the separator, where they may be collected and removed.

As an option, it is possible to provide an accumulated volume of pressurized air, which may be applied in the reverse direction of the separator body.

Hence, the cleaning procedure makes use of two valves: an inlet valve at the upstream side of the separator body and a cleaning valve on the downstream side of the separator body.

The inlet valve should provide sufficient shut-off of the incoming flow to the separator.

It is desirable to provide a cleaning valve, which is robust and which can be manufactured at low cost. Preferably, the cleaning valve should also be possible to open very quickly, such that a sudden burst of reverse flow can be achieved. Preferably, the cleaning valve should also be easy to maintain and allow for automation. That is, it should be possible to operate the valve through numerical control, such that a cleaning operation can be entirely automated and initiated by a controller when needed or when ordered by an operator.

While a very well-functioning cleaning valve is disclosed in WO2009041890A2, there is still room for improvement.

SUMMARY

It is an object of the present invention to provide an improved cleaning valve, and in particular an inlet valve which at least partially meets the criteria set forth by way of introduction.

The invention is defined by the appended independent claims, with embodiments being set forth in the dependent claims, in the attached drawings and in the following description.

According to a first aspect, there is provided a valve having a predetermined low pressure side, comprising a main valve closure body, arranged on a low pressure side of the valve and moveable to open towards the low pressure side, a control body, fixedly connected to the main valve closure body, such that a position of the main valve closure body is fixed relative to a position of the control body, a control chamber, partially defined by the control body, whereby a volume of the control chamber is variable in relation to the position of the control body, a control fluid connector for controlling a pressure in the control chamber, and a trigger valve which is movable between an open state and a closed state and which, in its open state, connects the control chamber to a pressure which is sufficiently high to allow the main valve closure body to open, wherein said trigger valve is a pressure balanced valve.

By the valve being able arranged to open towards a low-pressure side, the external force required to open the valve can be kept very low, and the lower pressure is effectively used to force the valve open.

By controlling the position of the main valve closure body based on a control body whose position is set relative to a pressure in a control chamber, it is possible to use a small air volume to control the main valve closure body, and thus to achieve a rapid opening of the main valve closure body.

The control body may have an effective area exposed to the control chamber which is greater than an effective area of the main valve closure body exposed to the low pressure side of the valve.

The term "effective area" relates to the area on which the pressure operates to provide a resulting force.

The control chamber may be defined by the control body, a base body and a flexible membrane sealingly connecting the control body with the base body, such that a volume of the control chamber is variable.

The main valve closure body may be formed as a substantially planar member.

The control body may be formed as a substantially planar member and oriented parallel with the main valve closure body.

Alternatively, the control chamber may be defined by the control body forming a piston and a cylinder in which the control body is movable, such that a volume of the control chamber is variable.

The valve may further comprise at least one spacer connecting the main valve closure body and the control body.

The main valve closure body may be biased towards its closed position.

The main valve closure body may be biased by the tension of the membrane, or bladder, as the case may be, or by a separate biasing device, such as a spring.

The trigger valve may comprise a trigger space, a first trigger closure body operable on a first trigger seat facing outwardly of the trigger space, a second trigger closure body, rigidly connected to the first trigger body and operable on a second trigger seat facing inwardly of the trigger space. The trigger closure bodies may present areas exposed to the trigger space, wherein the areas are equal or wherein the areas differ +/−less than 50%, preferably +/−less than 25% or +/−less than 10%.

The first trigger seat may be arranged on an inside of a trigger chamber while the second trigger seat may be arranged on an outside of the trigger chamber.

Hence, an underpressure (or vacuum, partial vacuum) on the inside of the trigger valve will operate to draw the first trigger closure body towards the first trigger seat, thus providing a force operating to close the trigger valve.

Simultaneously, the underpressure on the inside of the trigger chamber will operate to draw the second trigger closure body away from the second trigger seat, thus providing a force operating to close the trigger valve.

By selecting areas of the trigger closure bodies and connecting the trigger closure bodies to each other, the forces operating to open and close, respectively, the trigger valve may balance each other.

Depending on the design, the trigger space may be permanently open to the control space, with the first trigger seat facing ambient pressure.

Alternatively, the trigger space may be permanently open to the ambient pressure, with the second trigger seat facing ambient pressure.

The valve may further comprise a trigger member which is rigidly connected to the trigger closure bodies and exposed for manual operator interaction.

The valve may further comprise a trigger actuator, configured to control a state of the trigger valve.

The actuator may be a linear actuator arranged for causing the trigger closure bodies to move relative to the trigger seats.

According to a second aspect, there is provided use of a valve as described above in a separator for separating particles from a particle-laden fluid flow, wherein the valve is arranged on a downstream side of a separator body.

The separator body may take the form of a grille, a net or a filter medium.

In such use, fluid may be drawn through the separator by a suction generator arranged downstream of the separator.

In such use, the control connector may be in fluid connection with the suction generator at a point downstream of the separator, such that a pressure applied to the control connector is lower than a pressure applied to the separator space.

As an alternative, the control connector may be connected to a separate pump device 12490, arranged to supply a vacuum and/or a pressure to the control chamber and/or to the trigger space.

In such use, a pressure applied to the control connector and thus to the control chamber, may be sufficient to provide a control body closing force which is greater than a force provided by the suction force applied to the separator operating on the main valve closure body.

In such use, the separator may be adapted for separating particles from particle-laden air.

According to a third aspect, there is provided a separator for separating particles from a fluid flow, comprising a separator housing enclosing a separator body, a suction generator, connected to the separator housing at a downstream side of the separator body, an inlet for particle-laden fluid, the inlet connecting to the separator housing at an upstream side of the separator body, and a valve as described above, wherein the main valve closure body is openable inwardly into the separator housing.

The separator may further comprise an inlet valve, adapted for closing the inlet.

The separator may further comprise a separate pump device, arranged to supply a vacuum and/or a pressure to the control chamber and/or to the trigger chamber.

The separator may further comprise an accumulator arranged to accumulate a vacuum and/or a pressure, and selectively connected to the control chamber and/or to the trigger chamber, to apply said vacuum and/or pressure to the control chamber and/or trigger chamber.

According to a fourth aspect, there is provided a method of operating a separator having a separator body arranged in a separator space, with a separator space inlet arranged upstream of the separator body and a separator space outlet arranged downstream of the separator body. The comprises providing a valve as described above on a downstream side of the separator body, such that the valve in its closed state prevents communication between the separator space and an outside of the separator space, and in its open state allows communication between the separator space and the outside, applying a suction to the separator space outlet, applying a pressure to the control chamber that is sufficiently low for a resulting force generated on the control body to be higher than a force generated by the suction on the main valve closure body, and causing the trigger valve to shift from a closed position to the open position, whereby the force generated on the control body is reduced, such that the suction applied to the main valve closure body causes the main valve closure body to open the valve to the outside.

BRIEF DESCRIPTION OF THE DRAWINGS

FIG. 1 is a schematic drawing of a system comprising a floor grinding machine 2 and a heavy duty vacuum cleaner 1.

FIG. 2 is a schematic perspective view of a separator 12, which may form part of the vacuum cleaner 1.

FIGS. 3a-3b schematically illustrates an upper portion of the separator housing 127 with the cleaning valve assembly 124 installed.

DETAILED DESCRIPTION

Figure 4:
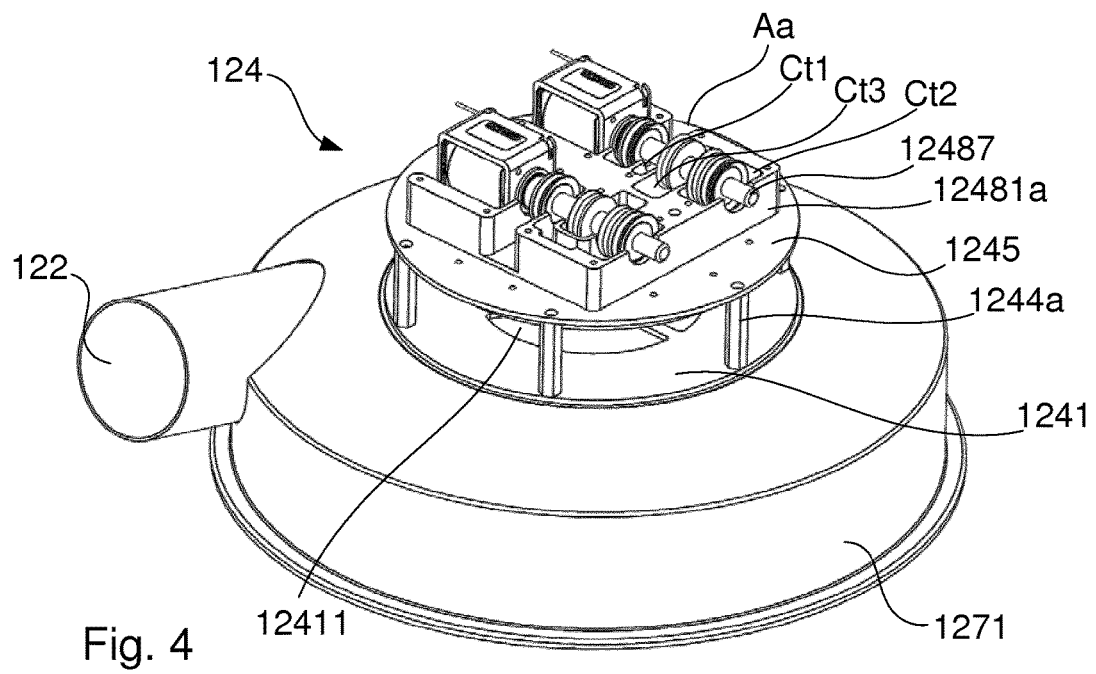
FIG. 4 schematically illustrates the upper portion of the separator housing 127 and the cleaning valve assembly 124 with a cover lid of the trigger valve removed.

In the following description, the valve will be described with reference to its use in a separator that forms part of a heavy duty vacuum cleaner useful in a floor grinding context.

Referring to FIG. 1, a system comprises a floor grinding machine 2, which may be any type of floor grinding machine having a connection for evacuation of grinding residues. The system further comprises a heavy duty vacuum cleaner unit 1, which comprises a pre-separator 11 illustrated as a cyclone type separator; a main separator 12 comprising an inlet 121, an outlet 122, an inlet valve 123, a cleaning valve 124, and a separator body 126, such as a filter. The system further comprises a post-separator 13, such as a HEPA filter and a suction generator 14, which may comprise a motor driving a fan to create an airflow.

FIG. 2 schematically illustrates the separator 12 with the separator inlet 121, the outlet 122, the inlet valve 123 and a housing 127. The cleaning valve 124 is also visible at the top of the housing 127.

Referring to FIGS. 3a-3b, there is illustrated an upper portion 1271 of the separator housing 127 with a cleaning valve assembly 124 mounted thereto.

Referring to FIG. 4, the cleaning valve 124 comprises a valve base 1241, which may be formed as a separate member, that is adapted for being mounted to an opening in the separator housing 127, 1271. Alternatively, the valve base 1241 may be integrated with the separator housing 127, 1271, such as formed in one piece therewith.

The valve base 1241 comprises one or more valve openings 12411, which provide a flow area that is sufficiently large to allow the air volume necessary to rapidly flow into the separator housing 127.

Figure 5A:
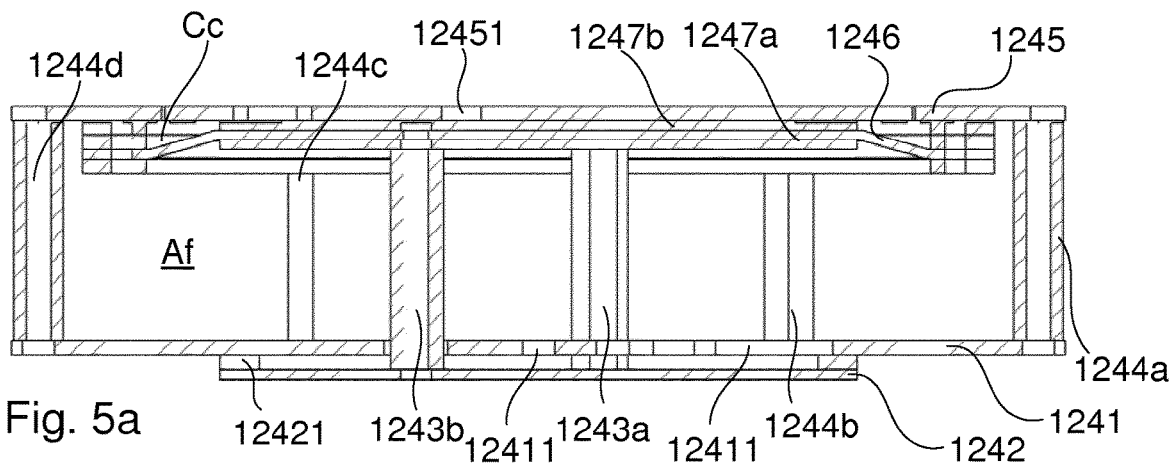
FIGS. 5a and 5b are cross sectional views of the valve and the control valve.
Figure 5B:
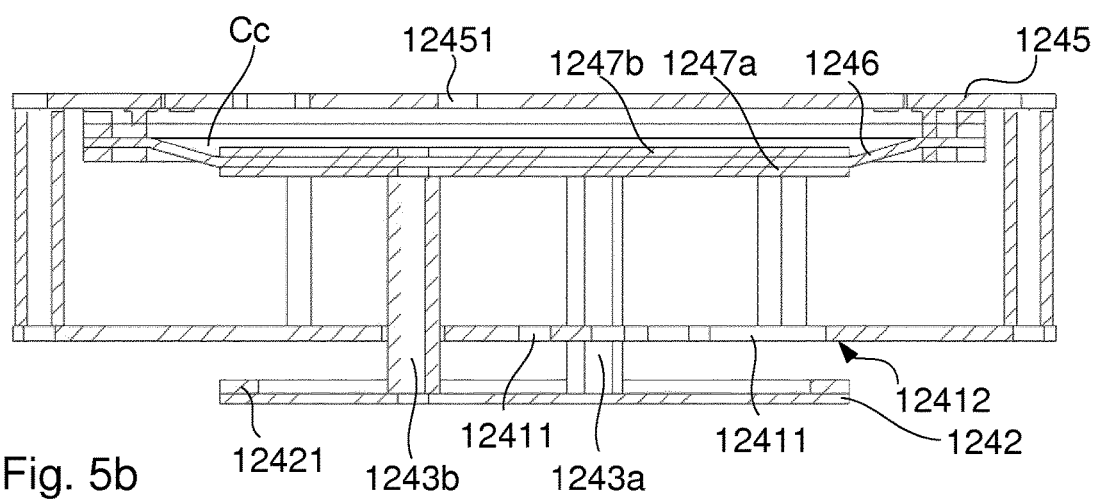

The valve base 1241 also provides a valve seat 12412, i.e. a seat against which the valve closure 1242 member is to cooperate in its closed position (FIG. 5a). This valve seat 12412 is arranged on the face of the valve base 1241 which is to face the interior of the separator housing 127, which will be a low pressure side of the valve 124.

In the illustrated example, the valve base 1241 is formed as a base plate, made of a piece of sheet metal. Moreover, in the illustrated example, the valve base 1241 has a generally circular shape, i.e. a circular outer perimeter and the openings 12411 are formed as segments of a circle or of an annulus.

The valve 124 further comprises a valve closure body 1242, which cooperates with the valve seat 12412 when the valve is in its closed position (FIG. 5a).

A seal 12421 may be arranged at to seal between the valve seat 12412 and the valve closure body 1242, attached either to the seat or to the valve closure body (as illustrated).

The valve closure body 1242 may also be formed as a generally planar member, having a shape that is adapted to that of the opening and being slightly larger than the opening 12411, such that it can cover the opening to provide a sufficiently air-tight seal.

Spaced from the base, there is a control base 1245. The control base may be rigidly mounted to the valve base 1241 by means of one or more base spacers 1244a, 1244b, 1244c 1244d, such that a flow area Af is provided between the valve base 1241 and the control base 1245.

The control base 1245 defines, together with a control body 1247a, 1247b and a flexible membrane 1246, a control chamber Cc. The control body 1247a, 1247b is connected to the control base 1245 via the membrane 1246, such that the control body 1247a, 1247b is movable relative to the control base 1241 while a volume of the control chamber Cc varies.

The control body 1247a, 1247b is rigidly connected to the valve closure body 1242 by means of one or more valve spacers 1243a, 1243b, such that the control body 1247a, 1247b and the valve closure body 1242 always maintain a predefined distance and orientation relative each other.

The control body 1247a, 1247b may also be formed as a planar member, such as from a piece of sheet metal.

As one design example, an effective area of the control body 1247a, 1247b exposed towards the control chamber Cc may be greater than an effective area of the valve closure body 1242 that is exposed to the low pressure side of the separator housing 127.

The membrane 1246 may be an elastically flexible membrane, such as a rubber elastic membrane.

The membrane 1246 may be formed as an annular member, with its radially outer edge attached and sealed against an outer portion of the control base 1245 and with its radially inner edge attached and sealed against an outer portion of the control body 1247a, 1247b.

Alternatively, the membrane 1246 may be a circular member, which is connected to the 1247a, 1247b.

As yet another alternative, the membrane 1246 may be wholly or partially sandwiched between a pair of control body members 1247a, 1247b.

The control base 1245 may be formed as a substantially planar member. In the alternative, it may be formed or mounted so as to define a chamber. For example, the base 1245 may present side walls so as to define a substantially cylindrical control chamber, defined by the side walls, an axial wall, the membrane 1246 and the control body 1247a, 1247b, with the membrane and the control body 1247a, 1247b being movable relative to the control base 1245.

A fluid connector 12485 is arranged to provide a fluid connection to the trigger chamber Ct1, Ct2, Ct3 and from there to the trigger chamber/control chamber, such that a vacuum can be drawn in the control chamber Cc in order to close the valve closure body 1242.

The axial wall of the control base 1245 may also present a trigger opening 12451, i.e. an opening through which the control chamber Cc may be connected to ambient pressure Aa, such that the valve closure body 1242 may open. This opening may be provided with any type of valve that can be opened sufficiently quickly to allow enough air to flow into the control chamber Cc to rapidly increase pressure therein so that the vacuum in the separator housing 127 will cause the valve closure body 1242 to open.

In the following, a trigger valve 1248, that can be used to control this trigger opening 12451, will be described.

Figure 6A:
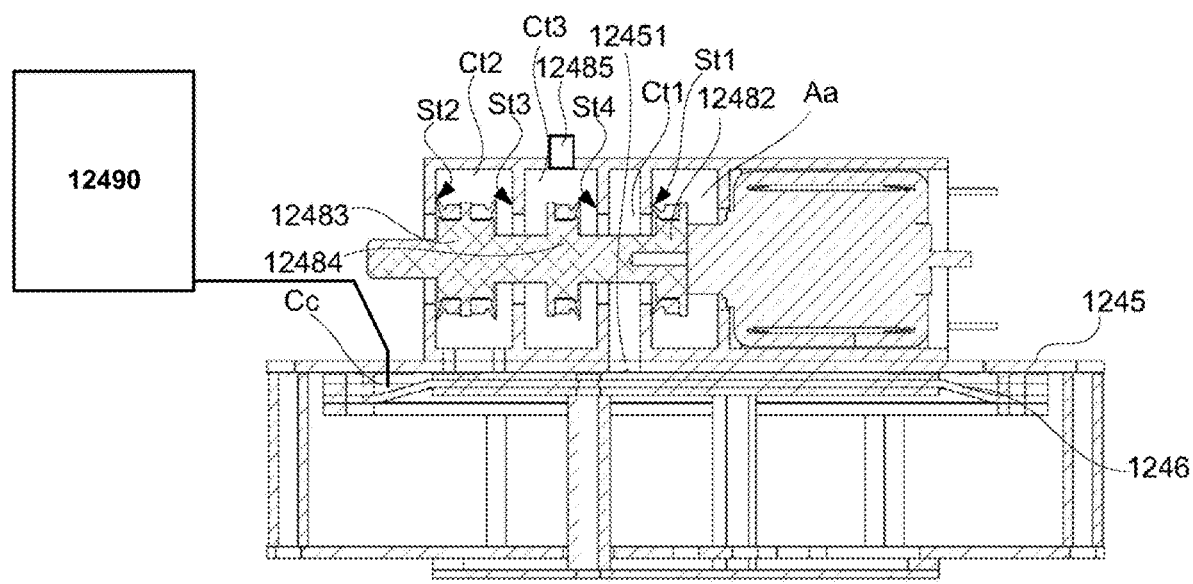
FIGS. 6a and 6b are cross sectional views of the cleaning valve assembly.
Figure 6B:
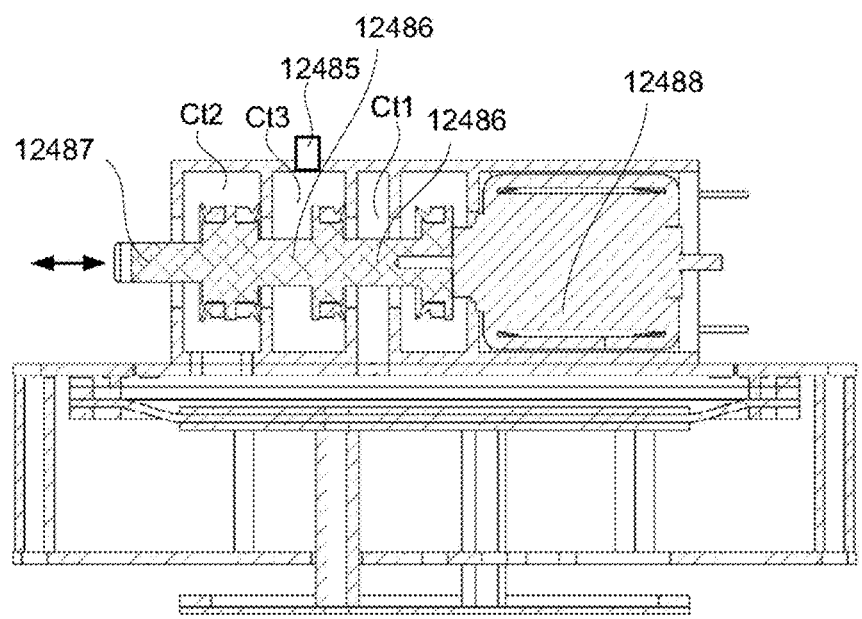

Referring to FIGS. 6a-6b, the trigger valve 1248 may comprise a trigger valve housing 12481a, 12481b defining at least one trigger chamber Ct1, Ct2, Ct3, that is connected to the control chamber Cc.

In the illustrated example, there are three interacting trigger chambers Ct1, Ct2, Ct3 provided.

The first trigger chamber Ct1 provides a constant (i.e. always open) connection to the control chamber Cc. and present port openings towards ambient pressure Aa and towards the third trigger chamber Ct3.

The port opening from the first trigger chamber towards the ambient pressure Aa is regulated by a first trigger closure body 12482, which is arranged on the outside of the first trigger chamber Ct1, where it cooperates with a first trigger valve seat St1 to regulate the connection between the first trigger chamber Ct1 and the ambient pressure Aa.

The second trigger chamber Ct2 provides a constant connection to the control chamber Cc and houses the second trigger closure body 12483, which cooperates either with the second trigger valve seat St2 to regulate a connection to the ambient pressure Aa, or with the third trigger valve seat St3 to regulate a connection to the third trigger chamber Ct3.

The third trigger chamber Ct3 provides a constant connection to the control connector 12485 and houses the third trigger closure body 12484, which cooperates with the fourth trigger valve seat St3 to regulate the connection to the first trigger chamber Ct1.

Figure 7A:
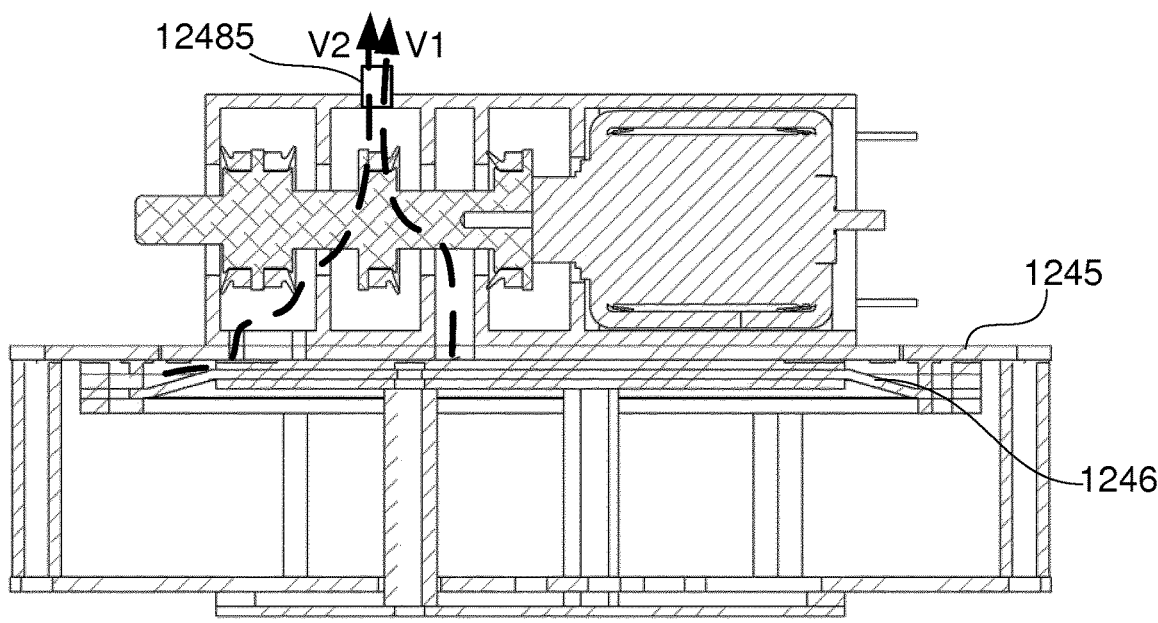
FIGS. 7a and 7b schematically illustrate flow paths in the valve shown in FIGS. 6a and 6b.

In the closed position (FIGS. 6a, 7a) of the cleaning valve 124, the first trigger chamber Ct1 is open to the third trigger chamber Ct3, such that vacuum (suction from e.g. the suction generator 14) applied through the control connection 12485 may be applied to the control chamber Cc through the first and third trigger chambers Ct1, Ct3, as illustrated by arrow V1 in FIG. 7a.

Further, in the closed position of the trigger valve, the first trigger chamber Ct1 is sealed off from ambient pressure by the first trigger valve body 12482 interacting with the first trigger valve seat St1.

Moreover, in the closed position of the trigger valve, the second trigger chamber Ct2 is sealed off from ambient pressure by the second trigger valve body 12483 interacting with the second trigger valve seat St2.

Also in the closed position of the trigger valve, the second trigger chamber Ct2 is open to the third trigger chamber Ct3, such that vacuum applied by the suction generator 14 may be applied to the control chamber Cc through the second and third trigger chambers Ct2, Ct3, as illustrated by arrow V2 in FIG. 7a.

Figure 7B:
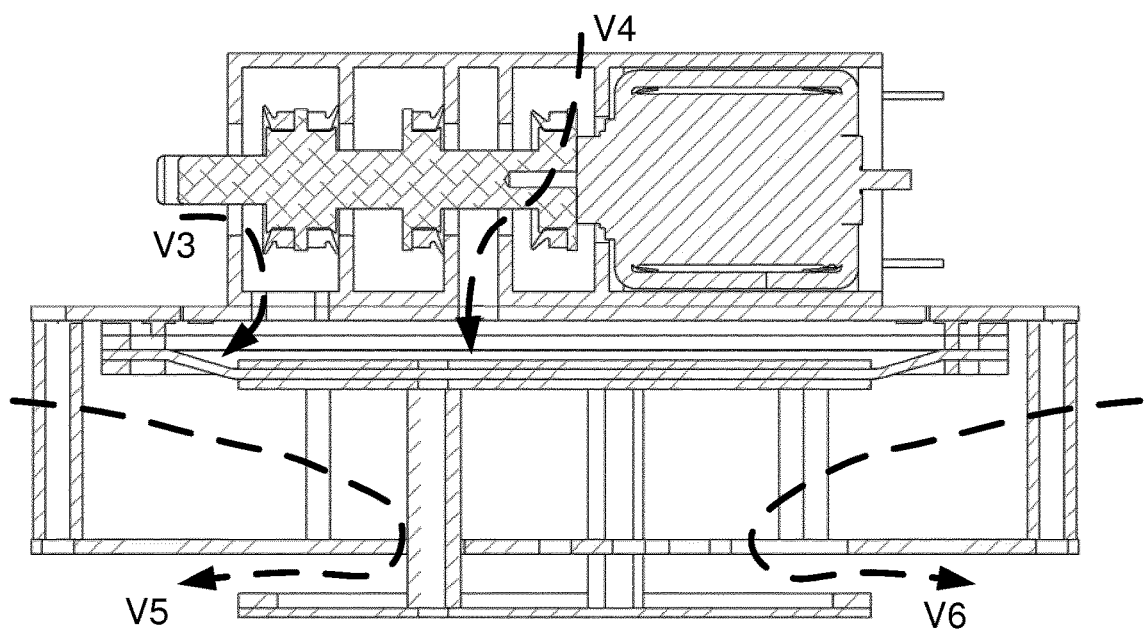

In the open position (FIG. 6b, 7b) of the trigger valve, the first trigger chamber Ct1 is sealed from the third trigger chamber Ct3 by the third trigger valve body 12484 interacting with the fourth trigger valve seat St4, such that no vacuum is applied to the control chamber Cc through the first and third trigger chambers Ct1, Ct3.

Further, in the open position of the trigger valve, the first trigger chamber Ct1 is open to ambient pressure by the first trigger valve body 12482 being spaced from the first trigger valve seat St1.

Moreover, in the open position of the trigger valve, the second trigger chamber Ct2 is open to ambient pressure by the second trigger valve body 12484 being spaced from the second trigger valve seat St2.

Also in the open position of the trigger valve, the second trigger chamber Ct2 is sealed off from the third trigger chamber Ct3 by the second trigger valve body 12483 interacting with the third trigger valve seat St3, such that no vacuum is applied to the control chamber Cc through the second and third trigger chambers Ct2, Ct3.

Hence, in the open position of the trigger valve, the control connection 12485 only draws a vacuum in the third trigger chamber Ct3, but not in the control chamber Cc.

With the third trigger valve seat St3 operating on the outside of the third trigger valve chamber Ct3 and the fourth trigger valve seat St4 operating on the inside of the third trigger valve chamber Ct3, the force provided by the vacuum connection 12485 is balanced.

Likewise, with the first trigger valve seat St1 operating on the ambient pressure side of the trigger valve, and the second trigger valve seat St2 operating on the inside that is subjected to vacuum from the suction generator 14 when the trigger valve is in the closed position, the forces provided by the vacuum connection 12485 are balanced.

It is noted that at each area of interaction between a trigger valve seat St1, St2, St3, St4 and a trigger valve body 12482, 12843, 12484 a seal may be provided. Such seal may be arranged on the valve seat and/or on the valve body.

It is noted that the second trigger valve body 12483 may be provided by one or two separate valve bodies.

The trigger valve bodies 12482, 12843, 12484 are rigidly connected to each other by a trigger axle 12486. For example, the trigger valve closure bodies 12482, 12843, 12484 may be aligned with each other in an axial direction of the trigger valve, whereby the valve closure bodies are movable back and forth along that axial direction.

That is, the lower pressure inside the trigger chamber Ct1, Ct2, Ct3 will operate to pull the first trigger valve closure body 12482 towards the first trigger valve seat St1 and simultaneously, it will pull the second trigger valve closure body 12483 inwardly, away from the valve second seat St2.

Since the trigger valve closure bodies 12482, 12843, 12484 are rigidly connected to each other, the forces operating on the respective body will balance each other.

When the trigger valve closure bodies 12482, 12843, 12484 are in the valve's 124 closed position, the pressure inside the trigger chamber Ct1, Ct2, Ct3 will be the same as in the control chamber Cc, due to the connection to the control chamber.

When the trigger valve closure bodies are in the open position, the trigger chamber Ct1, Ct2, Ct3 will communicate with ambient air pressure, and so will also the control chamber Cc.

In order to control the position of the trigger valve closure bodies 12482, 12843, 12484, there may be provided an operating member 12487, which may comprise a pin that may be pushed or pulled by hand by an operator to close or open the trigger valve.

A spring (not shown) may be provided to slightly bias the trigger valve closure bodies 12482, 12843, 12484 towards the closed position of the trigger valve (FIGS. 6a, 7a).

An actuator 12488 may be provided to control a position of the trigger valve closure bodies 12482, 12843, 12484. Such actuator may, as an example, be formed as a coil providing a linear movement of the trigger valve closure bodies along the axial direction.

The cleaning valve 124 may be operated as follows.

The cleaning valve 124 is mounted to an opening in a wall 127 of the separator 12, at the downstream side of the separator body 126, such that the inside of the valve 124 faces inwardly into the separator chamber and the outside of the valve is exposed to ambient air pressure.

A fluid connection 125 is provided to the trigger chamber/control chamber Cc via the control connector 12485 and connected to the suction generator 14 of the separator 1 at a point that is closer to the suction generator than a separator outlet 122. For example, another separator, such as a post-separator 13 may be arranged between the separator outlet 122 and the connection to the suction generator 14, such that a lower pressure will be provided to the control chamber Cc than to the separator outlet 122. As an alternative, the control connection may be connected to a separate pump (not shown) for drawing a vacuum and/or for applying a pressure to the trigger chamber/control chamber.

The connection 125 between the connector 12485 and the suction generator 14 may be controlled by a valve 1253, which may be arranged to selectively connect the trigger chamber/control chamber Cc to the suction generator 14 or to ambient pressure.

In an embodiment with the trigger valve, the valve 1253 is not necessary.

In an embodiment without the trigger chamber, the connection 125 may be connected directly to the control chamber Cc, with the valve 1253 being used to trigger the valve 124 to open. In such case, the underpressure to the control chamber may be supplied directly from the suction generator 14 or from an accumulator 1251.

During normal operation, the inlet valve 123 will be held open, as will the cleaning valve 124 by virtue of the suction drawn at the control connection 12485 being greater than the suction provided at the separator outlet 122.

With the separator 12 running, i.e. the suction generator 14 activated, an inlet valve 123 is closed, such that a very low pressure is provided in the separator 12 chamber. Simultaneously, an even lower pressure is provided in the control chamber Cc, due to its connection to the suction generator 14.

Through the lower pressure in the control chamber Cc, and optionally also the larger effective surface area of the control body 1247a, 1247b, the suction force provided on the control body 1247a, 1247b will be greater than the suction force provided on the valve closure body 1242 by the vacuum inside the separator housing 127. Hence, the valve closure body 1242 will be kept in the closed position, as illustrated in FIGS. 5a, 6a, 7a.

Faces of the members 1247a, 1247b forming the control body may be slightly convex, such that the membrane may be fixedly attached to the control body at a central portion thereof, while, at the edges of the control body 1247a, 1247b, the membrane may move relative to the control body, to further enhance its flexibility.

As another option, or additionally, edges of the membrane may be formed creases such as to provide a bellows, to further increase its mobility.

Once a sufficiently low pressure has been built up in the separator chamber, and/or after a predetermined time of operation with the inlet valve 123 closed, the trigger valve 124 is caused to open. When the trigger valve is opened, ambient air pressure flows into the control chamber Cc, as illustrated by arrows V3, V4 in FIG. 7b, such that the pressure in the control chamber Cc rapidly increases. When the pressure in the control chamber Cc reaches a sufficient level (which it does very quickly due to the small size of the trigger chamber Ct1, Ct2, Ct3 and the control chamber Cc and the relatively large trigger valve openings), the force provided on the control body 1247a, 1247b will decrease, whereby the lower pressure in the separator chamber 127 will force open the valve closure body 1242, to rapidly allow air to burst in, as illustrated by arrows V5, V6, such that a reverse flow through the separator body 126 is achieved, and optionally, the separator body 126 is agitated. In practice, this is a very rapid sequence.

After the cleaning operation, the trigger valve 1248 is allowed to return to its closed state (FIGS. 5a, 6a, 6b), whereby the pressure in the control chamber Cc is again reduced until the suction force operating on the control body 1247a, 1247b is sufficient to cause the valve closure body 1242 to return to its closed position.

The cleaning procedure may then be repeated, if desired.

If the cleaning is deemed to be completed, the inlet valve is opened and normal operation is resumed.

Optionally, an accumulator 1251 may be provided between the suction generator 14 and the control connection 12485. By allowing the suction generator 14 to operate via the accumulator 1251 and a non-return valve 1252, it is possible to accumulate a vacuum so that a faster response time for the valve may be provided when it is desired to open the valve.

The connection 125 between the connector 12485 and the suction generator 14 may be controlled by the valve 1253, which may be arranged to selectively connect the trigger chamber/control chamber to the accumulator 1251 or to ambient pressure.

As yet another option, the accumulator 1251 may be arranged to provide a pressure higher than ambient pressure, to further speed up the opening of the valve 124.

The accumulator 1251 may be formed by a hollow chassis of the machine. That is, vacuum, or pressure, may be stored inside e.g. hollow beams forming the machine chassis.

The invention claimed is:

1. A valve having a predetermined low pressure side, comprising:
    a main valve closure body arranged on the low pressure side of the valve, the main valve closure body being moveable towards the low pressure side into an open position and away from the low pressure side into a closed position,
    a control body, fixedly connected to the main valve closure body, such that a position of the main valve closure body is fixed relative to a position of the control body,
    a control chamber, partially defined by the control body, whereby a volume of the control chamber is variable in relation to the position of the control body,
    a control fluid connector coupled to the control chamber, and
    a trigger valve movable between an open state and a closed state to control operation of the control chamber and move the main valve closure body, the trigger valve being a pressure balanced valve;
    wherein the trigger valve comprises:
        a trigger space coupled to the control fluid connector,
        a first trigger closure body operable on a first trigger seat facing outwardly of the trigger space, and
        a second trigger closure body, rigidly connected to the first trigger closure body and operable on a second trigger seat facing inwardly of the trigger space;
    wherein, in the open state, the first trigger closure body is positioned away from the first trigger seat and the second trigger closure is positioned away from the second trigger seat to connects the trigger space and the control chamber to first pressure which is sufficiently high to expand the volume of the control chamber and cause the main valve closure body to move into the open position;

wherein, in a closed state, the first trigger closure body is positioned in engagement with the first trigger seat and the second trigger closure is positioned in engagement with the second trigger seat to seal the trigger space from the first pressure and connect the trigger space and the control chamber to a suction source that contracts the volume of the control chamber and causes the main valve closure body to move into the closed position.

2. The valve as claimed in claim 1, wherein the control body has an effective area exposed to the control chamber which is greater than an effective area of the main valve closure body exposed to the low pressure side of the valve.

3. The valve as claimed in claim 1, wherein the control chamber is defined by the control body, a base body and a flexible membrane sealingly connecting the control body with the base body, such that a volume of the control chamber is variable;

wherein the main valve closure body is arranged to move to open in a first direction;

wherein the trigger valve is arranged to move between the open state and the closed state in a second direction substantially perpendicular to the first direction.

4. The valve as claimed in claim 1, wherein the main valve closure body is formed as a substantially planar member.

5. The valve as claimed in claim 1, wherein the control body is formed as a substantially planar member and oriented parallel with the main valve closure body.

6. The valve as claimed in claim 1, wherein the control chamber is defined by the control body forming a piston and a cylinder in which the control body is movable, such that a volume of the control chamber is variable.

7. The valve as claimed in claim 1, wherein the main valve closure body is biased towards the closed position.

8. The valve as claimed in claim 1, wherein the trigger closure bodies present areas exposed to the trigger space, wherein the areas are equal or wherein the areas differ +/−less than 50%, preferably +/−less than 25% or +/−less than 10%.

9. The valve as claimed in claim 1, further comprising a trigger actuator configured to control the trigger valve to be in the open state or the closed state.

10. A system for separating particles from a fluid flow, comprising:
a separator comprising a separator housing that encloses a separator body,
a suction generator, connected to the separator housing at a downstream side of the separator body,
an inlet for particle-laden fluid, the inlet connecting to the separator housing at an upstream side of the separator body, and
a valve as claimed in claim 1, wherein the main valve closure body is openable inwardly into the separator housing.

11. The system as claimed in claim 10, further comprising an inlet valve, adapted for closing the inlet.

12. The system as claimed in claim 10, further comprising a separate pump device, arranged to supply a vacuum and/or a pressure to the control chamber.

13. The system as claimed in claim 10, further comprising an accumulator arranged to accumulate a vacuum and/or a pressure, and selectively connected to the control chamber, to apply said vacuum and/or pressure to the control chamber.

14. A method of operating a separator having a separator body arranged in a separator housing, with a separator inlet arranged upstream of the separator body and a separator outlet arranged downstream of the separator body, the method comprising:
providing a valve as claimed in claim 1 on a downstream side of the separator body, such that the valve in its closed position prevents communication between an inside of a separator housing and an outside of the separator housing, and in its open position allows communication between the inside of the separator housing and the outside of the separator housing,
applying a suction to the separator space outlet, and
applying a pressure to the control chamber that is sufficiently low for a resulting force generated on the control body to be higher than a force generated by the suction on the main valve closure body.

15. The method as claimed in claim 14, further comprising causing the trigger valve to shift from the closed state to the open state, whereby the force generated on the control body is reduced, such that the suction applied to the main valve closure body causes the main valve closure body to open the valve to the outside of the separator housing.

16. The valve of claim 1, wherein the trigger valve further comprises an ambient air opening;
wherein, when the trigger valve is in the open state, the trigger valve is configured to open a first airflow pathway from the ambient air opening through a trigger opening and into the control chamber and close a second airflow pathway to the control connector;
wherein, when the trigger valve is in the closed state, the trigger valve is configured to close the first airflow pathway from the ambient air opening and open the second airflow pathway from the control chamber through the trigger opening to the control connector.

17. The valve of claim 1, wherein, when the trigger valve is in the open state, the control chamber expands into and reduces a volume of a flow area of the valve;
wherein the air flow from the ambient pressure through the opening to the low pressure passes through the flow area.

* * * * *